Dec. 27, 1927. 1,653,896
R. G. EMERSON
DISPENSING CONTAINER
Filed May 4, 1927
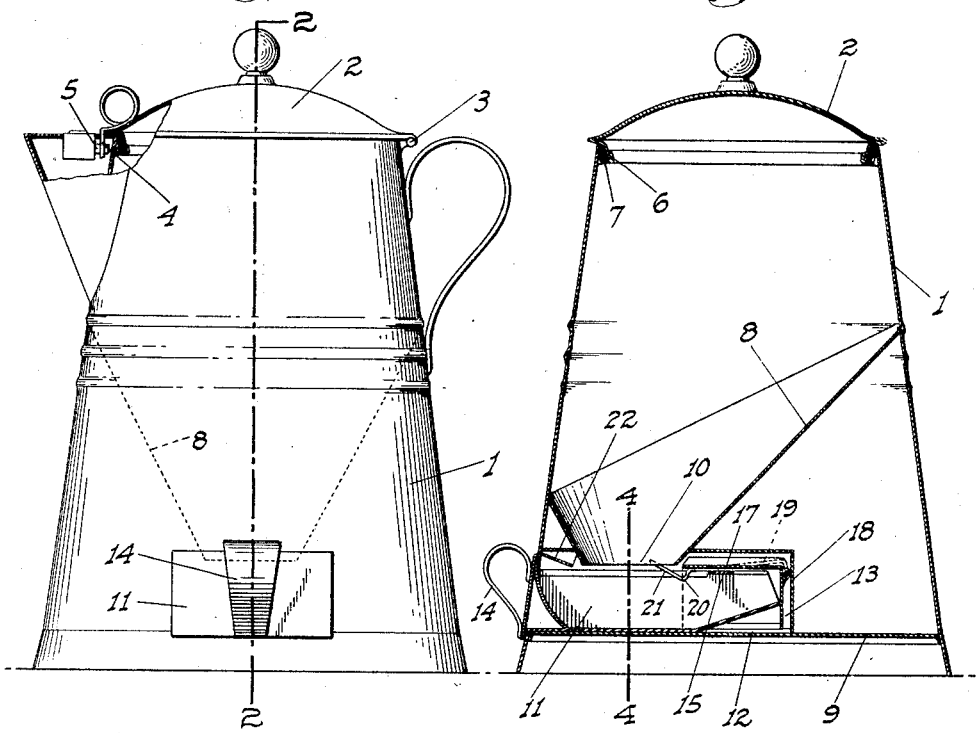
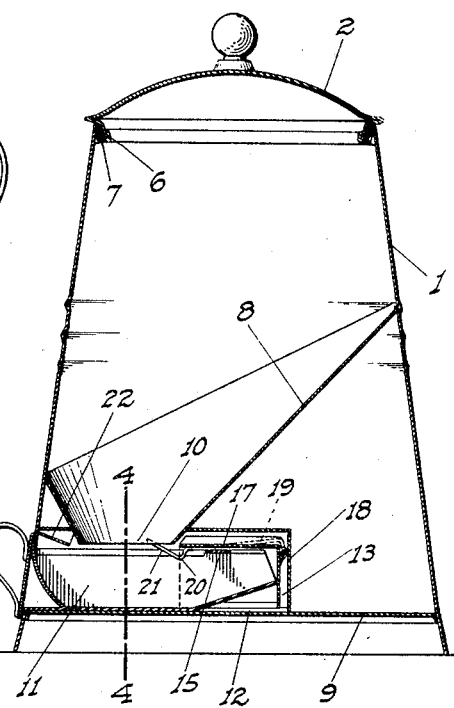
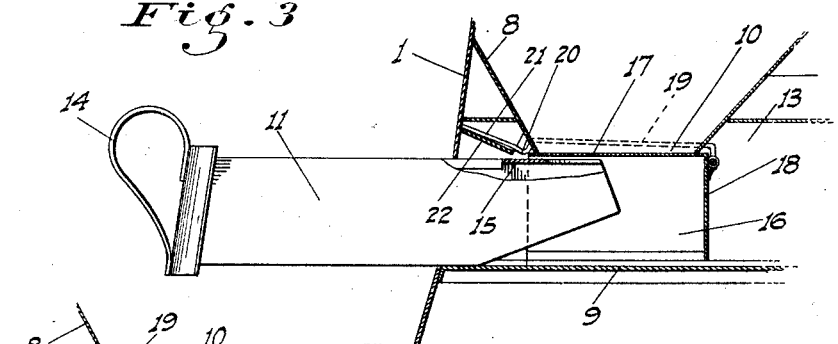
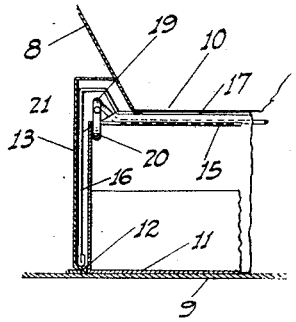
INVENTOR
R. G. Emerson
BY
ATTORNEY Patented Dec. 27, 1927.

1,653,896

UNITED STATES PATENT OFFICE.

RUSSELL G. EMERSON, OF MODESTO, CALIFORNIA.

DISPENSING CONTAINER.

Application filed May 4, 1927. Serial No. 188,833.

This invention relates to improvements in containers for bulk groceries or the like, especially for those of a dry and ready flowing nature, such as coffee, sugar, certain cereals and the like, and from which the goods are dispensed either for retail sale in a store or for individual use in kitchens. My device is suitable for use either in stores to dispense and sell goods from the container at retail, or in kitchens or pantries, the goods as dispensed being then used directly in the preparation of meals. In ordinary dispensing containers the goods are both placed in and removed from the container at the top. This permits the goods at the bottom to become stale, since usually when the supply in the container becomes depleted it is refilled without actually emptying it. The result is that the container always holds a certain quantity of the original supply, which sooner or later deteriorates and frequently causes deterioration of the fresh goods above.

The principal object of my invention therefore is to eliminate the above objectionable feature by providing a dispensing container for the purpose so constructed that while it is filled from the top the goods are dispensed from the bottom. This insures the goods passing continuously through the container from top to bottom so that no goods ever become stale by remaining untouched in the bottom of the container for long periods, with the objectionable results above pointed out.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a front elevation of the container as constructed in a certain fanciful form.

Fig. 2 is a transverse section on the line 2—2 of Fig. 1, with the dispensing drawer in place.

Fig. 3 is a fragmentary enlarged vertical section of the structure showing the drawer nearly removed, and with the dispensing outlet closed.

Fig. 4 is a fragmentary cross section on the line 4—4 of Fig. 2.

Referring now more particularly to the characters of reference on the drawings, the device comprises a receptacle 1 of suitable shape and capacity. In the present instance I have depicted the container as shaped like an ordinary coffee pot, to hold bulk coffee, but such shape can of course be altered if desired. The receptacle is provided with a lid 2 preferably hinged as at 3, with a lock tongue 4 opposite to the hinge adapted to be engaged by the lock bar 5 of a suitable locking device mounted on the container. The lid preferably has a downwardly extending flange 6 around the same to extend into the top of the container and engage a ring 7 of felt or the like to maintain a substantially air tight fit.

Fixed in the container is a false bottom formed of a funnel shaped member 8 having a forward cant. This member terminates some distance above the lower bottom member 9 and is provided at its lower end with a horizontal outlet opening 10, disposed near the front side of the container.

The front of the container between the bottom 9 and the plane of the opening 10 is provided with an opening to receive a dispensing drawer 11 therein, which is supported on the bottom member 9 and is guided between rails 12 formed at the lower ends of vertical side walls 13 projecting upwardly from said member 9. The outer end of the drawer is provided with a suitable handle 14 for manipulating the same. The top of the drawer is open for some distance from its outer end so as to register with the opening 10, and beyond said open portion is provided with a transverse top wall 15. The inner end of the drawer beyond said wall 15 is open to form a dispensing or pouring mouth.

Supported by the rails 12 is a sliding cover device comprising vertical members 16 disposed between the walls 13 and the sides of the drawer, and connected across the top above said drawer by a plate 17, which is arranged to make a close fit against the under face of the opening 10 to cover the same. A back wall 18 is provided in connection with the plate 17 and members 16, said wall being engaged by the inner end of the drawer when the latter is slid into place and being then pushed inwardly of the container. The length of the cover plate 17 is such that when the drawer is completely inserted in the container, said plate will be then clear of the opening 10 inwardly of or beyond the same relative to the front of the container as shown in Fig. 2. Pivotally mounted in connection with the slide for vertical swinging movement and projecting ahead of and above the plate 17 to the sides of the opening 10 are rods 19. These rods terminate at their forward ends in depending catches 20 which when the drawer is in place depend in front of the member 15 of the drawer in the path of movement thereof. It will therefore be seen that as the drawer is withdrawn from the container the slide will be moved outwardly also. As the plate 17 moves to an outlet covering position, upwardly and forwardly projecting extensions 21 formed with the catches 20 engage upwardly sloping pockets 22 located in the container in front of the opening 10. These extensions and the pockets are so disposed that by the time the cover plate 17 has moved to a position to completely cover the outlet, the catches will be raised clear of the wall 15 of the drawer. This permits further and complete withdrawal of the drawer without further movement of the slide taking place. The cover plate will then remain in its closing position and nothing can then drop from the container while the drawer is removed.

When the drawer is replaced the inner end of the same engages the back wall 18 of the slide member, and the latter is pushed back until the catch extensions clear the pockets and the catches again drop in front of the wall 15, ready to be engaged thereby when the drawer is again moved in the opposite or outward direction.

The above movement of the slide causes the outlet 10 to be again opened, allowing the goods in the container to flow into the drawer, so that whenever the latter is again withdrawn it will always be full as long as a supply remains in the container itself. When the supply is depleted the lid 2 is raised and the necessary amount of produce is poured in to the container from the top.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A dispensing device comprising a container having a top opening in which to place the produce to be dispensed and a lower horizontal dispensing outlet, a removable drawer slidably mounted in connection with the container below the outlet to register with the same, a sliding closure for the outlet disposed between the drawer and outlet, means provided with the closure for engagement with the inner end of the drawer when the latter is being inserted in place whereby to move the closure inwardly and clear of the outlet, means connected to the closure member to be engaged by the drawer for moving the closure to cover the outlet when the drawer is moved outwardly of the container, and means acting to automatically move said first named means out of engagement with the drawer when the closure has moved to completely cover the outlet.

2. A dispensing device comprising a container having a top opening in which to place the produce to be dispensed and a lower horizontal dispensing outlet, a removable drawer slidably mounted in connection with the container below the outlet to register with the same, a sliding closure for the outlet disposed between the drawer and outlet, means provided with the closure for engagement with the inner end of the drawer when the latter is being inserted in place whereby to move the closure inwardly and clear the outlet, a yieldable catch member mounted in connection with and depending in front of the closure member for engagement with the drawer when the latter is being slid outwardly of the container, and means between said catch member and the container for moving said member out of engagement with the drawer after the closure has moved to fully cover the outlet.

3. A dispensing device comprising a container having a top opening in which to place the produce to be dispensed and a lower horizontal dispensing outlet, a removable drawer slidably mounted in connection with the container below the outlet to register with the same, a sliding closure for the outlet disposed between the drawer and outlet, means provided with the closure for engagement with the inner end of the drawer when the latter is being inserted in place whereby to move the closure inwardly and clear of the outlet, a yieldable catch member mounted in connection with and depending in front of the closure member for engagement with the drawer when the latter is being slid outwardly of the container, a forward extension provided with the catch member, and a sloping pocket mounted in the container toward the front thereof to engage the extension and move the catch member clear of the drawer when with the outward movement of the latter the closure has moved to fully cover the outlet.

In testimony whereof I affix my signature.

RUSSELL G. EMERSON.